(12) United States Patent
Kumagai et al.

(10) Patent No.: US 7,612,809 B2
(45) Date of Patent: *Nov. 3, 2009

(54) CAMERA APPARATUS AND IMAGE PROCESSING METHOD

(75) Inventors: Atsuhiro Kumagai, Kanagawa (JP); Koichi Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 727 days.

This patent is subject to a terminal disclaimer.

(21) Appl. No.: 11/110,573

(22) Filed: Apr. 19, 2005

(65) Prior Publication Data

US 2005/0185068 A1 Aug. 25, 2005

Related U.S. Application Data

(63) Continuation of application No. 09/455,207, filed on Dec. 6, 1999, now Pat. No. 7,046,281.

(30) Foreign Application Priority Data

Dec. 8, 1998 (JP) ................................ 10-348875

(51) Int. Cl.
H04N 5/76 (2006.01)
(52) U.S. Cl. ................................ 348/231.3; 348/231.7
(58) Field of Classification Search ............... 348/231.7
See application file for complete search history.

(56) References Cited

U.S. PATENT DOCUMENTS

| 5,440,401 | A | 8/1995 | Parulski et al. |
| 5,917,542 | A | 6/1999 | Moghadam et al. |
| 6,154,755 | A | 11/2000 | Dellert et al. |
| 6,167,002 | A * | 12/2000 | Taira et al. ............... 369/30.09 |
| 6,192,191 | B1 * | 2/2001 | Suga et al. ................. 386/120 |
| 6,243,352 | B1 | 6/2001 | Kanno et al. |

FOREIGN PATENT DOCUMENTS

| EP | 0 825 758 | 2/1998 |
| EP | 0 871 161 | 10/1998 |
| JP | 2 110859 | 4/1990 |
| JP | 2 198088 | 8/1990 |
| JP | 3 183091 | 8/1991 |
| JP | 6-315107 | 11/1994 |
| JP | 7 245723 | 9/1995 |

(Continued)

Primary Examiner—Tuan V Ho
(74) Attorney, Agent, or Firm—Frommer Lawrence & Haug LLP; William S. Frommer; Thomas F. Presson

(57) ABSTRACT

A camera apparatus equipped with an optical system, a photographing element for converting a light signal of an object to be photographed from the optical system to an electric signal, an A/D conversion unit for converting the electric signal from the photographing element to digital image data, a data compression unit for compressing the image data from the A/D conversion unit with a prescribed form based on a software program. Data conversion converts the compressed data from the data compression unit to a prescribed form of data that is recordable into a direct read after write type optical disk or a rewritable optical disk that records the compressed data. The camera enables a user to watch on a personal computer static images that have been photographed without making data transfer to the personal computer.

8 Claims, 16 Drawing Sheets

FOREIGN PATENT DOCUMENTS

| | | |
|---|---|---|
| JP | 9 135412 | 5/1997 |
| JP | 10-136294 | 5/1998 |
| JP | 10-174032 | 6/1998 |
| JP | 10 320260 | 12/1998 |
| WO | WO 98 57294 | 12/1998 |

* cited by examiner

FIG. 6

| | | | |
|---|---|---|---|
| Area0 | 0000000 ... 0ffffff | Built-in ROM 64HB | 8000000 ... 8ffffff | Non-use |
| Area1 | 1000000 ... 1ffffff | Non-use | 9000000 ... 9ffffff | DRAM 1MB |
| Area2 | 2000000 ... 2ffffff | ODC Register | a000000 ... affffff | Non-use |
| Area3 | 3000000 ... 3ffffff | Non-use | b000000 ... bfffff | Non-use |
| Area4 | 4000000 ... 4ffffff | Non-use | c000000 ... cfffff | Non-use |
| Area5 | 5000000 ... 5ffffff | Built-in Peripheral Module | d000000 ... dfffff | Non-use |
| Area6 | 6000000 ... 6ffffff | Non-use | e000000 ... efffff | Flash Memory 256KB |
| Area7 | 7000000 ... 7ffffff | Non-use | f000000 ... ffffff | Built-in RAM 4KB |

FIG. 13

Thumbnail Management Table

| File Number | Main-body Image File | Corresponding Thumbnail Address |
|---|---|---|
| 1 | 001.JPG | h |
| 2 | 002.JPG | g |
| 3 | 004.JPG | e |
| 4 | 005.JPG | o |
| 5 | 006.JPG | d |
| 6 | 007.JPG | c |
| 7 | 008.JPG | b |
| 8 | 009.JPG | a |
| 9 | 010.JPG | f |

FIG. 14
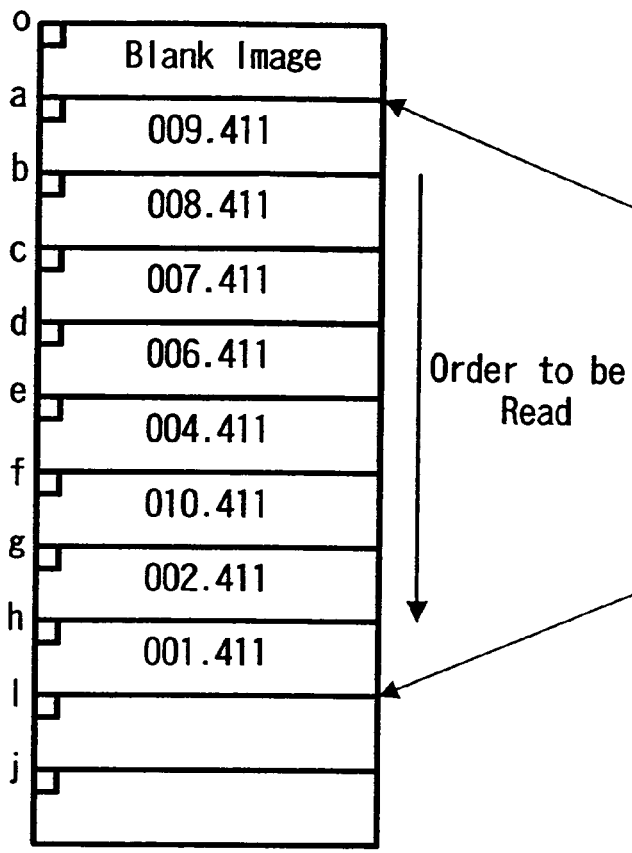
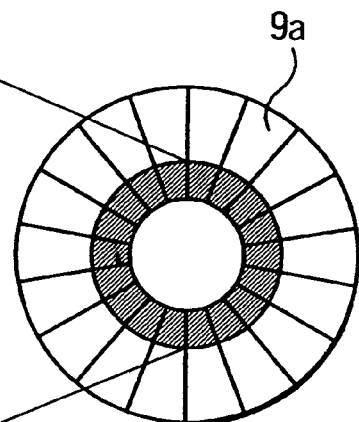
FIG. 15
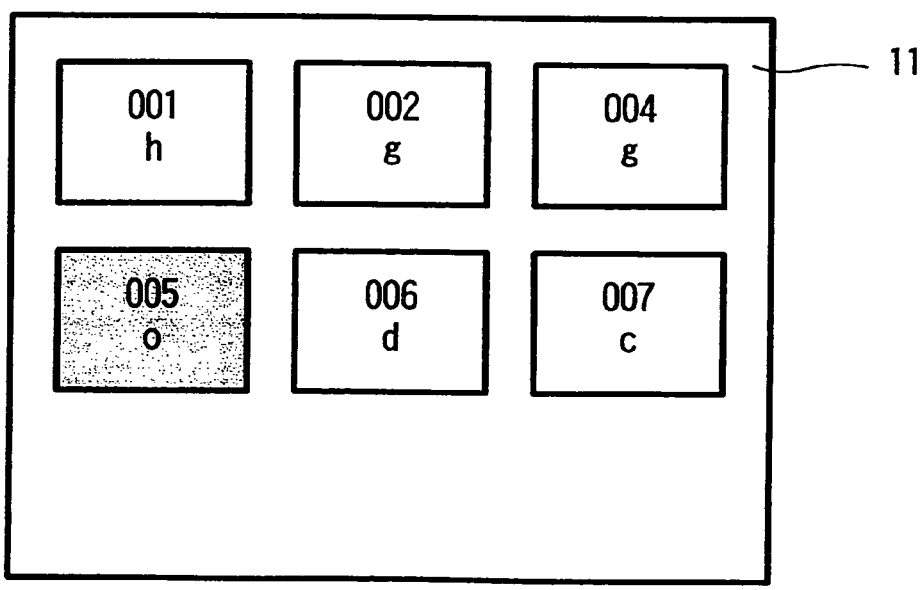

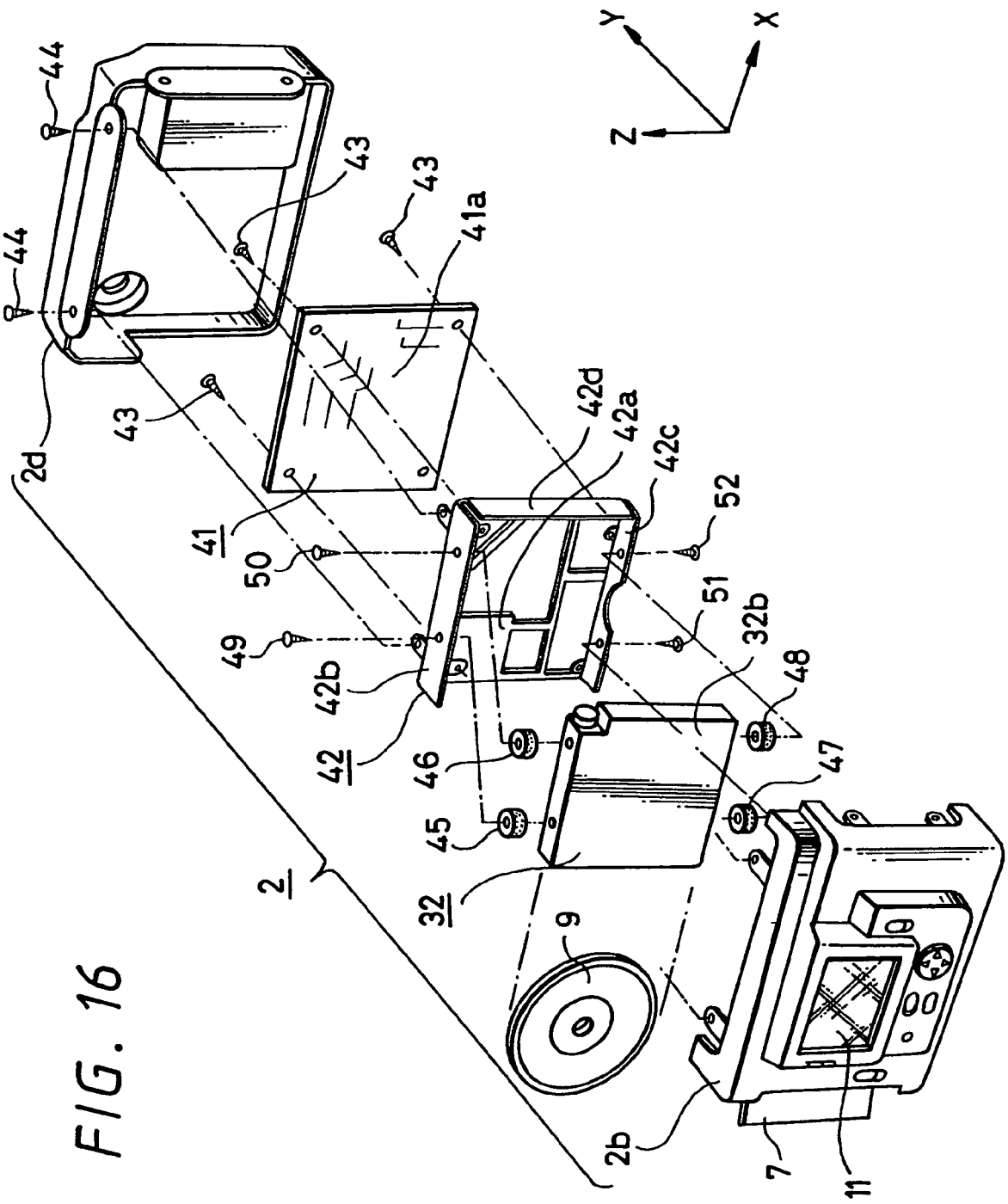

CAMERA APPARATUS AND IMAGE PROCESSING METHOD

This application is a continuation of U.S. application Ser. No. 09/455,207, filed Dec. 6, 1999 now U.S. Pat. No. 7,046,281.

BACKGROUND OF THE INVENTION

1. Field of the Invention

The present invention relates to a camera apparatus and an image processing method, and more particularly to a camera apparatus and an image processing method that digitizes an image of an object to be photographed and that records it in the form of a static image.

2. Field of the Invention

In recent years, with the diffusion of personal computers, etc., digital camera apparatuses that digitize an image and record the same have been becoming increasingly popular as an image recording apparatus. This digital camera apparatus in general is arranged to have an image, which becomes a photographed object, digitized therein, and have this digitized image recorded beforehand into a prescribed recording medium such as a flash memory or the like in an amount corresponding to a prescribed number of sheets, as static image data. This static image can thereafter be output to the monitor of a personal computer.

In a conventional digital camera apparatus, as the recording medium for recording image data thereof, there were used a flash memory of a type built in a main body thereof, a card type flash memory that is removably insertable, etc.

However, in the conventional digital camera apparatus, the unit cost of each of these memories with respect to one of the photographed sheets is high and therefore they are not suitable as storage media. Therefore, after photographing, it is necessary that the photographed static image data be transferred to a hard disk, a floppy disk, etc. of a personal computer for being copied. This transfer of the data necessitated the use of a large amount of time and labor. Also, in the conventional digital camera apparatus, there was the problem that the price of those memories was high and so the user could not possess so many sheets of memories and therefore the number of photographed sheets was limited. Especially, there was the problem that the opportunities of photographing in the outdoors, etc. to that a personal computer cannot be brought were largely limited.

SUMMARY OF THE INVENTION

The present invention has been proposed in view of the above-described actual circumstances and has an object to provide a camera apparatus which makes it possible to watch photographed static images on a personal computer without transferring the data to the personal computer.

A camera apparatus of the present invention is equipped with an optical system, a photographing element for converting a light signal of an object to be photographed from the optical system to an electric signal, an A/D conversion unit for converting the electric signal from the photographing element to digital image data, a data compression means for compressing the image data from the A/D conversion unit with a prescribed form in accordance with a software program, and a data conversion means for converting the compressed data from the data compression means to a prescribed form of data that is recordable into a direct read after write type optical disk, or a rewritable optical disk, that records the compressed data.

According to the above-described construction of the present invention, the light signal of an object to be photographed from the optical system is converted to a prescribed form of data that is recordable into a direct read after write type optical disk, or a rewritable optical disk by the photographing element, the A/D conversion unit, the data compression means, and the data conversion means.

BRIEF DESCRIPTION OF THE DRAWINGS

FIG. 6 is a view illustrating an address space of the microcomputer;

FIG. 13 is a view illustrating a thumbnail management table;

FIG. 14 is a view illustrating a status wherein the thumbnail image files have been stored from the optical disk into prescribed areas of the DRAM;

FIG. 15 is a view illustrating a status wherein the thumbnail files, etc. have been displayed on the LCD panel;

FIG. 16 is an exploded perspective view used to explain the mechanical construction of the digital camera apparatus;

DESCRIPTION OF THE PREFERRED EMBODIMENTS

The present invention is a camera apparatus that is equipped with an optical system, a photographing element for converting a light signal of an object to be photographed from the optical system to an electric signal, an A/D conversion unit for converting the electric signal from the photographing element to digital image data, a data compression means for compressing the image data from the A/D conversion unit with a prescribed form in accordance with a software program, and a data conversion means for converting the compressed data from the data compression means to a prescribed form of data that is recordable into a direct read after write type optical disk, or a rewritable optical disk, that records the compressed data.

Also, the present invention is constructed in such a way that, in the above-described camera apparatus, the diameter of the direct read after write optical disk or the rewritable optical disk is 80 mm.

Figure 1:
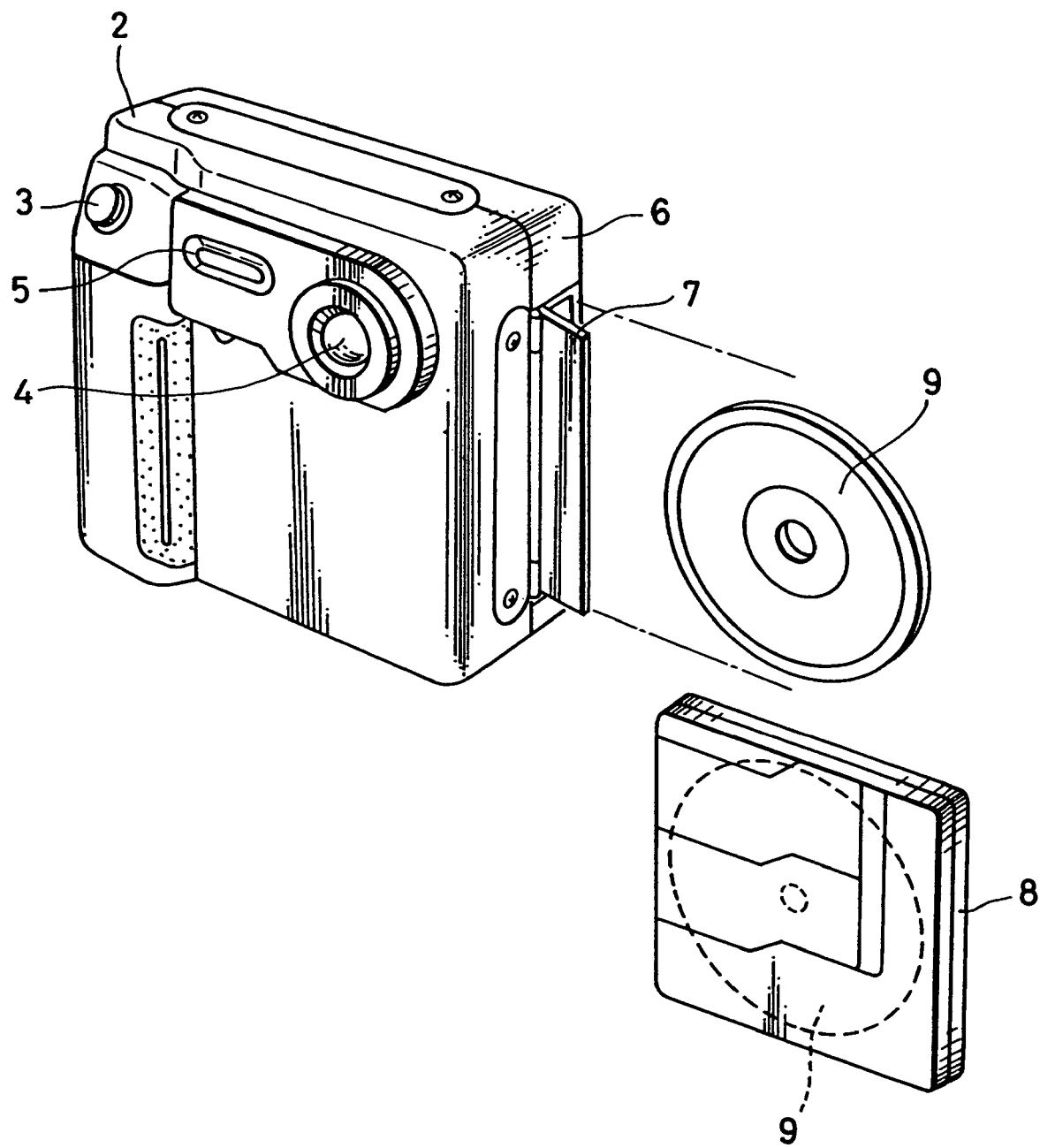
FIG. 1 is a perspective view of the outer appearance that is taken from the front surface side of a digital camera apparatus that has been provided by the present invention.

As an embodiment of the present invention, an outer appearance view taken from the front side of a digital camera apparatus is illustrated in FIG. 1.

This digital camera apparatus 1 has an outer configuration that is shaped like a substantially rectangular parallelepiped as a whole and is of a portable size. This digital camera apparatus 1 is equipped with a shutter button 3, an objective lens 4, and a flash 5 at the upper part on the front side of a housing 2, and is arranged so as to push the shutter button 3 with an index finger of a user's right hand.

Also, the digital camera apparatus 1 has mounted thereon an opening/closing lid 7 at one side surface portion 6 of the housing 2, and is arranged so that an optical disk 9 (hereinafter referred to as "an optical disk 9") having a size whose diameter is 80 mm may be loaded into the interior of the housing 2 from this side surface portion 6 side.

Figure 2:
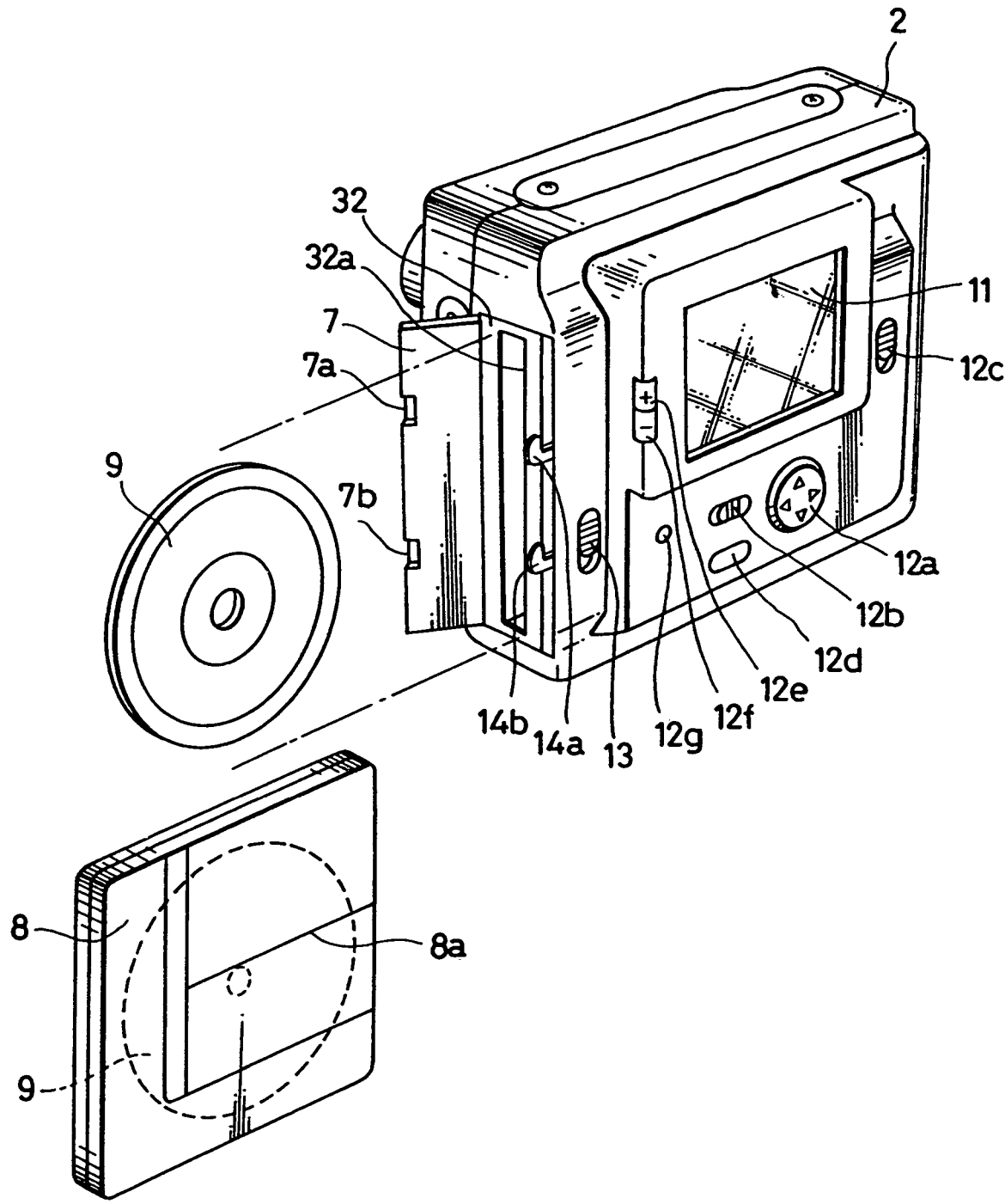
FIG. 2 is a perspective view of the outer appearance that is taken from the rear surface side of the digital camera apparatus.

It is to be noted that the digital camera apparatus 1 may be constructed so as to receive the optical disk 9 within a disk cartridge 8 such as that illustrated in FIGS. 1 and 2 in array with the optical disk 9 and to load this disk cartridge 8 having the optical disk 9 received therein into the interior of the housing 2.

Specifically, as have shown in FIG. 2 the outer appearance as viewed from the rear side of the digital camera apparatus 1, an optical disk drive (ODD) 32 whose details will be later described is disposed in the interior of the housing 2. The optical disk 9 (or the disk cartridge 8) is inserted from an disk insertion opening (or a cartridge insertion opening) 32a of the optical disk drive 32.

Further, the digital camera apparatus 1 is equipped with a LCD (Liquid Crystal Display) panel 11 on the rear surface side of the housing 2, and is so arranged that at the time of photographing an object to be photographed may be displayed on this LCD panel 11.

And, in the digital camera apparatus 1, when an object to be photographed is photographed by pushing the shutter button 3, image data of this object to be photographed (hereinafter referred to as "main-body image data") and thumbnail image data, becoming an index regarding this main-body image data, are recorded into the optical disk 9 that has been loaded into the optical disk drive 32, respectively, in the form of files respectively having extended characters ".JPG" and ".411".

Also, the digital camera apparatus 1 is so arranged that, when reproducing the main-body image data after photographing of the object to be photographed, thumbnail images regarding the image data that has been recorded in the optical disk 9 may be displayed on the LCD panel 11 by the extent corresponding to a prescribed number of sheets, for example, six sheets. And, by designating a particular thumbnail image from among them, the main-body image data that corresponds to this thumbnail image is read out from the optical disk 9 and displayed on the LCD panel 11.

Further, the digital camera apparatus 1 is so arranged as to enable the performance with respect to the rewritable optical disk 9 of various edits such as, for example, erasing of unnecessary data of the main-body image data and thumbnail image data that have been stored in the rewritable optical disk 9, changing of the way of arraying the thumbnail images displayed on the LCD panel 11, etc.

Namely, in the digital camera apparatus 1, around the LCD panel 11 are disposed various operation buttons and switches 12a, 12b, 12c, 12d, 12e, 12f, 12g, etc. By operating these various operation buttons, etc, the camera apparatus is so arranged as to enable editing such as the operation of zooming, etc. when photographing is done, the designating of a particular thumbnail image when reproduction is made, erasure of the data and so on.

It is to be noted that, with regard to the opening and closing of the opening/closing lid 7, by moving an opening/closing operation part 13 up and down, the state of engagement between engaging pawls 14a, 14b interlocked with this opening/closing operation part 13 and engaging portions 7a, 7b of the opening/closing lid 7 is released or held as it is. The opening/closing lid 7 is thereby opened or closed.

Next, the circuit construction of the digital camera apparatus 1 will be explained.

Figure 3:
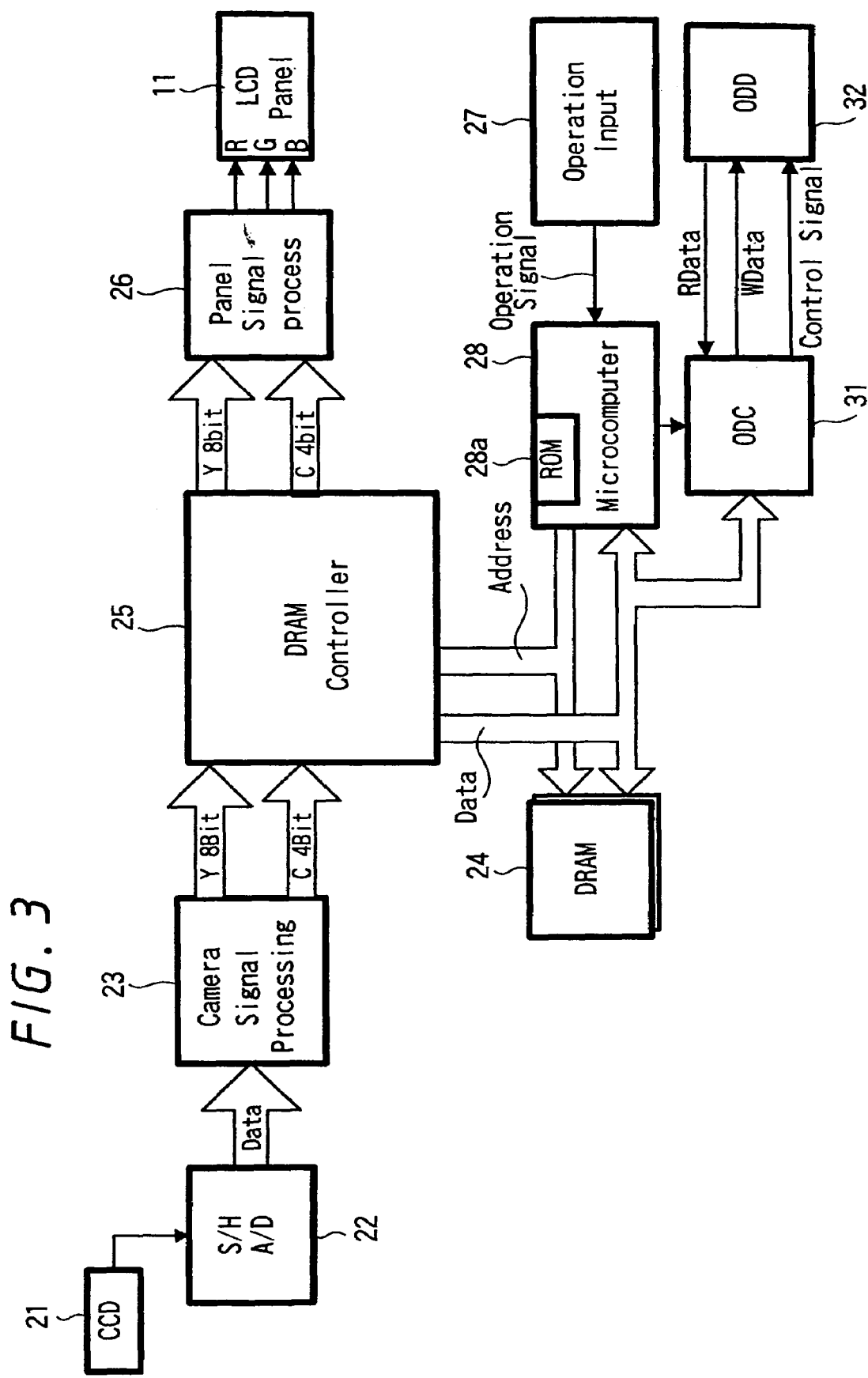
FIG. 3 is a block diagram illustrating the circuit construction of the digital camera apparatus.

The digital camera apparatus 1, as illustrated in FIG. 3, is constructed of a CCD 21 that is a photographing element, a sample/hold and analog/digital conversion circuit 22 (hereinafter referred to, merely, as "a sample/hold circuit 22"), a camera signal processing circuit 23, a DRAM 24, a DRAM controller 25, a panel signal processing circuit 26 for supplying RGB signals to the above-described LCD panel 11, an operation input part 27, a microcomputer 28 (hereinafter referred to as "a microcomputer 28"), an optical disk controller (ODC) 31, and an optical disk drive 32 that was described above in connection with FIG. 2.

It is to be noted that the DRAM 24, the DRAM controller 25, the microcomputer 28, and the ODC 31 are connected to one another by means of common buses.

In the digital camera apparatus 1, the light rays from an object to be photographed pass through the objective lens 4 and are received by the CCD 21, and then are converted to electric signals by this CCD 21. The output signal from the CCD 21 is sample/hold processed in the sample/hold circuit 22, and then is A/D converted to a digital signal that is composed of 10 bits. This A/D converted 10-bit digital signal is supplied to the camera signal processing circuit 23.

The camera signal processing circuit 23 performs proscribed pieces of processing with respect to the 10-bit digital signal supplied from the sample/hold circuit 22, and outputs the processed signals to the DRAM controller 25. The camera signal processing circuit 23 generates, in this embodiment, a luminance signal Y composed of 8 bits and a color-difference signal C composed of 4 bits, and is so arranged as to output these respective signals Y and C to the DRAM controller 25.

The DRAM controller 25 supplies the luminance signal Y and the color-difference signal C from the camera signal processing circuit 23 to the panel signal processing circuit 26 as they are.

It is to be noted that, in a case where the CCD 21 is not a square grid, the DRAM controller 25 converts the luminance signal Y and the color-difference signal C from the camera signal processing circuit 23 to square-grid signals, which in turn are supplied to the panel signal processing circuit 26. The panel signal processing circuit 26 produces a red signal R, a green signal G, and a blue signal B from the luminance signal Y and the color-difference signal C that have been input thereto, and outputs these respective RGB signals to the LCD panel 11. As a result of this, the image of the object to be photographed that becomes a photographed object is displayed on the LCD panel 11.

Also, the DRAM controller 25 stores the luminance signal Y and the color-difference signal C from the camera signal processing circuit 23 in a prescribed area of the DRAM 24 based on a control signal from the microcomputer 28 as later described in detail.

The operation input part 27 detects the contents of the operations of the shutter button 3 illustrated in FIG. 1 and the various operation buttons/switches 12a to 12g, etc. illustrated in FIG. 2, and outputs the thus-detected signals to the microcomputer 28 as operation signals.

As the microcomputer 28, there is used, for example, a type of RISC (Reduced Instruction Set Computer: reduced instruction set computer) that can perform high-speed processing. The microcomputer is equipped with a read only memory (ROM) 28a that has stored therein a software program for controlling each of the blocks. The microcomputer 28 executes the software program within this ROM 28a according to the operation signal from the operation input part 27 to thereby perform pieces of processing such as image compression/extension, file management and the like, which are done when performing photographing, reproduction, and editing as have been above referred to.

Practically, the microcomputer 28 stores the luminance signal Y and the color-difference signal C from the DRAM controller 25 into the prescribed area of the DRAM 24 when photographing the object to be photographed, and the microcomputer performs data compression processing on the thus-stored luminance signal Y and the color-difference signal C with the use of a JPEG (Joint Photographic coding Experts Group) method. Also, the microcomputer 28 performs write-in processing on the data of the main-body image that has been compressed with the JPEG method into an area, that is different from the above-described area of the DRAM 24, as JPEG stream data. Further, the microcomputer 28 reads out the JPEG stream data from the DRAM 24, and converts this data into an ISO9660 (International Organization for Standardization 9660: CD ROM logical format) format to thereby perform a piece of processing of supplying the resulting data to the ODC 31. And, the microcomputer 28 controls the ODC 31 so as to write the data, which has been converted to the ISO9660 format, into the optical disk 9 (within the disk cartridge 8) that has been loaded into the optical disk drive 32.

Figure 4:
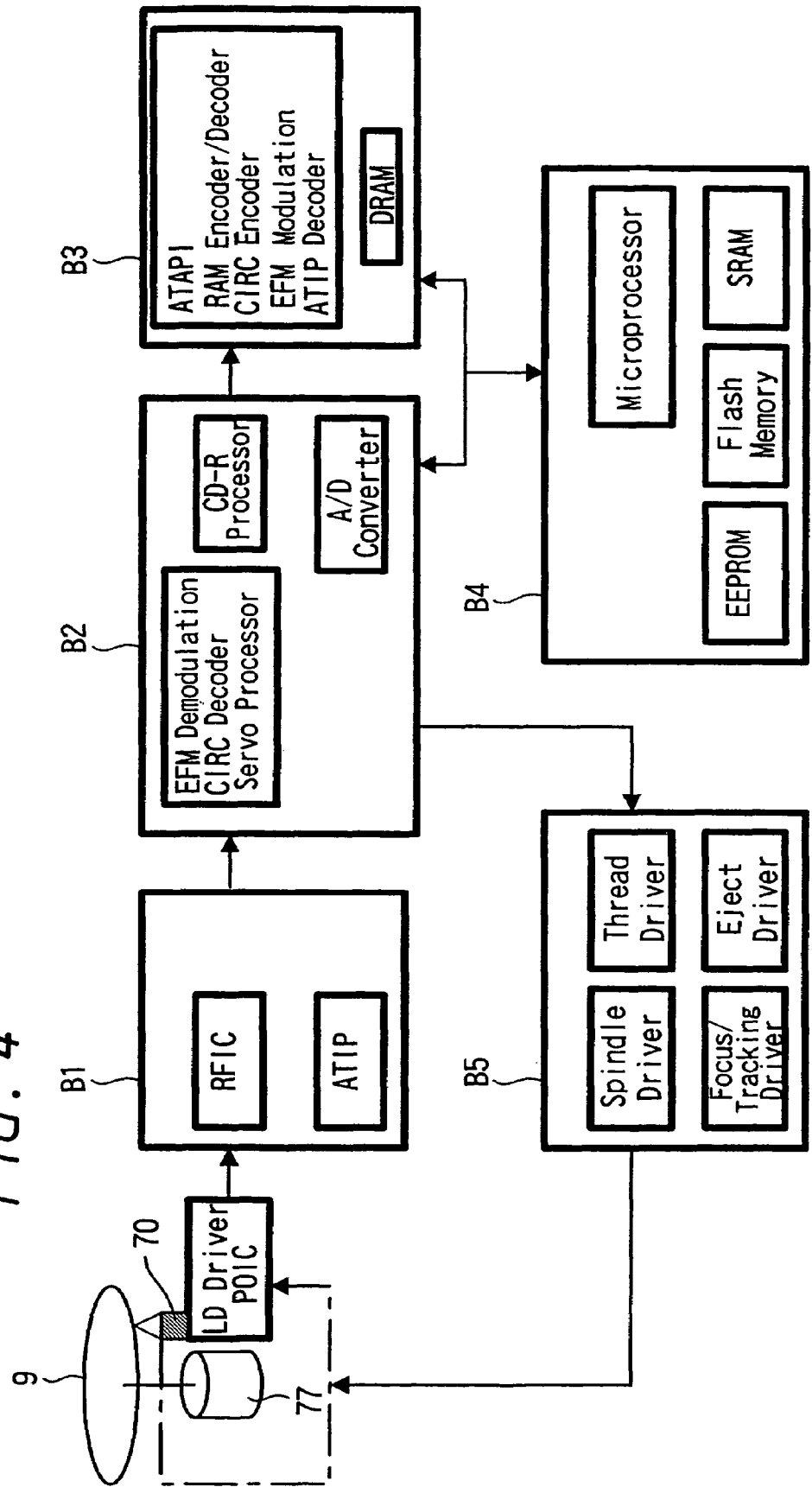
FIG. 4 is a block diagram illustrating the interior of an optical disk controller in FIG. 3.

Here, in FIG. 4, illustration is made of a block diagram within the optical disk controller (ODC) 31 of FIG. 3.

An optical pick-up 70 is constructed being equipped with a LD (semiconductor laser diode) driver and a PDIC (photodiode IC) constituting a light-receiving element.

As the control blocks there are five blocks, that is, an analog detecting part B1, a recording servo part B2, an interface part B3, a controller part B4, and a driver part B5. It is to be noted that a detailed explanation will be omitted of the details of the interiors of the respective part.

The analog detection part B1 processes the detection signal that has been obtained in the optical pick-up 70 and transmits it to the recording servo part B2.

The recording servo part B2 supplies a signal for use as an output signal to the interface part B3 based on the signal that has been supplied thereto. Simultaneously, the recording servo part sends a control signal for controlling a spindle motor and a sled motor, focusing/tracking, insertion/ejection of the optical disk, etc. to the driver part B5.

The driver part B5 outputs a signal for driving the spindle motor and the sled motor, for controlling focusing/tracking, and for driving the insertion/ejection of the optical disk based on the control signals.

On the other hand, the interface part B3 performs processing of its output signal so as to enable transmission and reception of signals between itself and the outside of the apparatus. In this interface part B3, there is performed the reception of the operation signal that is sent from the microcomputer 28 and the data that is sent from the DRAM controller 25 shown in FIG. 3.

The controller part B4 performs the control of the recording servo part B2 and the interface part B3.

Also, the digital camera apparatus 1 according to this embodiment is constructed to have a camera block for inputting image data additionally.

Figure 5:
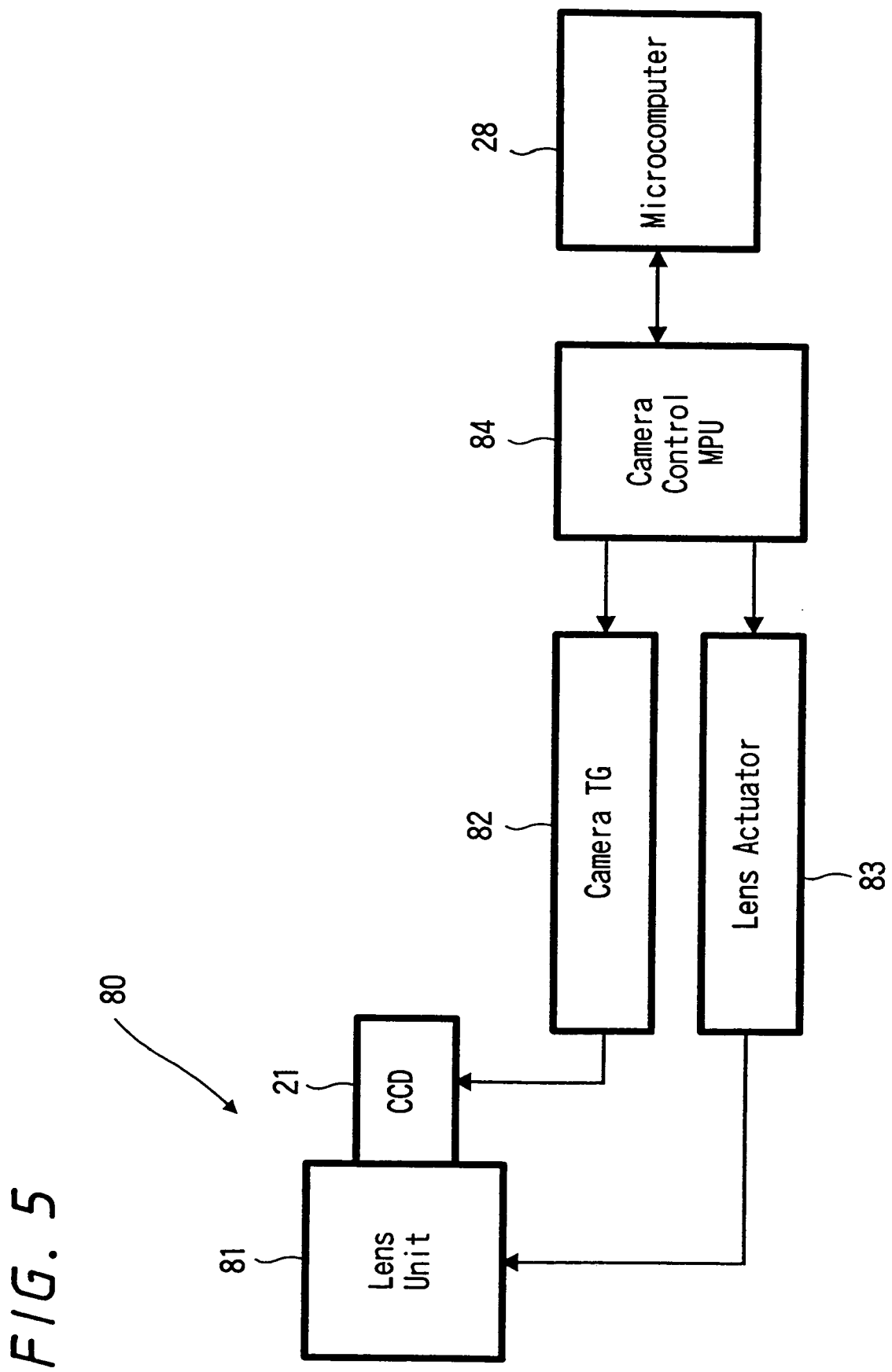
FIG. 5 is a block diagram illustrating a camera block and its neighboring portions.

FIG. 5 is a block diagram illustrating the camera block and its peripheral blocks.

The camera block 80 is constructed in a form having a lens unit composed of a plurality of lens including an objective lens, and the CCD 21.

Also, as the blocks for controlling the camera block 80, there are a camera timing generator (TG) 82, a lens actuator 83, a camera control MPU 84 that sends a control signal to each of these elements to perform the control thereof, and the above-described microcomputer 28. The control block arrangement is constructed having those elements.

The CCD 21 performs reading-out of images and transferring of image data according to a timing pulse signal for use for transfer and drive that has been prepared in the camera TG 82 according to a control signal from the camera control MPU 84.

Also, regarding the lens unit 81, in the lens actuator 83, focus, aperture, exposure, and so forth are controlled according to a control signal from the camera control MPU 84.

Between the camera control MPU 84 and the microcomputer 28 information of, for example, the operation status or the like is transmitted and received. Regarding the blocks of the camera signal processing 23 and the DRAM controller 25 that were stated above in connection with FIG. 3, also, information transmission and reception are similarly performed between these blocks and the microcomputer 28.

It is to be noted that there may be adopted a construction wherein the camera control MPU 84 and the microcomputer 28 are combined as one block.

Further, it is preferable to construct a control block so that, in a case where there is being used a writable optical disk such as a CD-R or the like, even when write-in error occurs for some reason or other, data may be written again into an area that is next to the area involving the write-in error, and that, in addition, at the point in time when all the data items have their write-in completed, continuous correct data can be read out as if the area in which error has occurred did not exist.

FIG. 6 is a view illustrating an address space of the microcomputer 28. In the microcomputer 28, as illustrated in FIG. 6, an area of 0000000 to 0ffffff corresponds to a built-in ROM area, an area of 2000000 to 2fffff corresponds to the area for the ODC 31, an area of 5000000 to 5ffffff corresponds to the area for the peripheral modules that are built in, an area of 9000000 to 9ffffff corresponds to the area for the DRAM 24, an area of e000000 to 9ffffff corresponds to the area for a flash memory as later described, and an area of f000000 to fffffff corresponds to the built-in RAM area.

Figure 7:
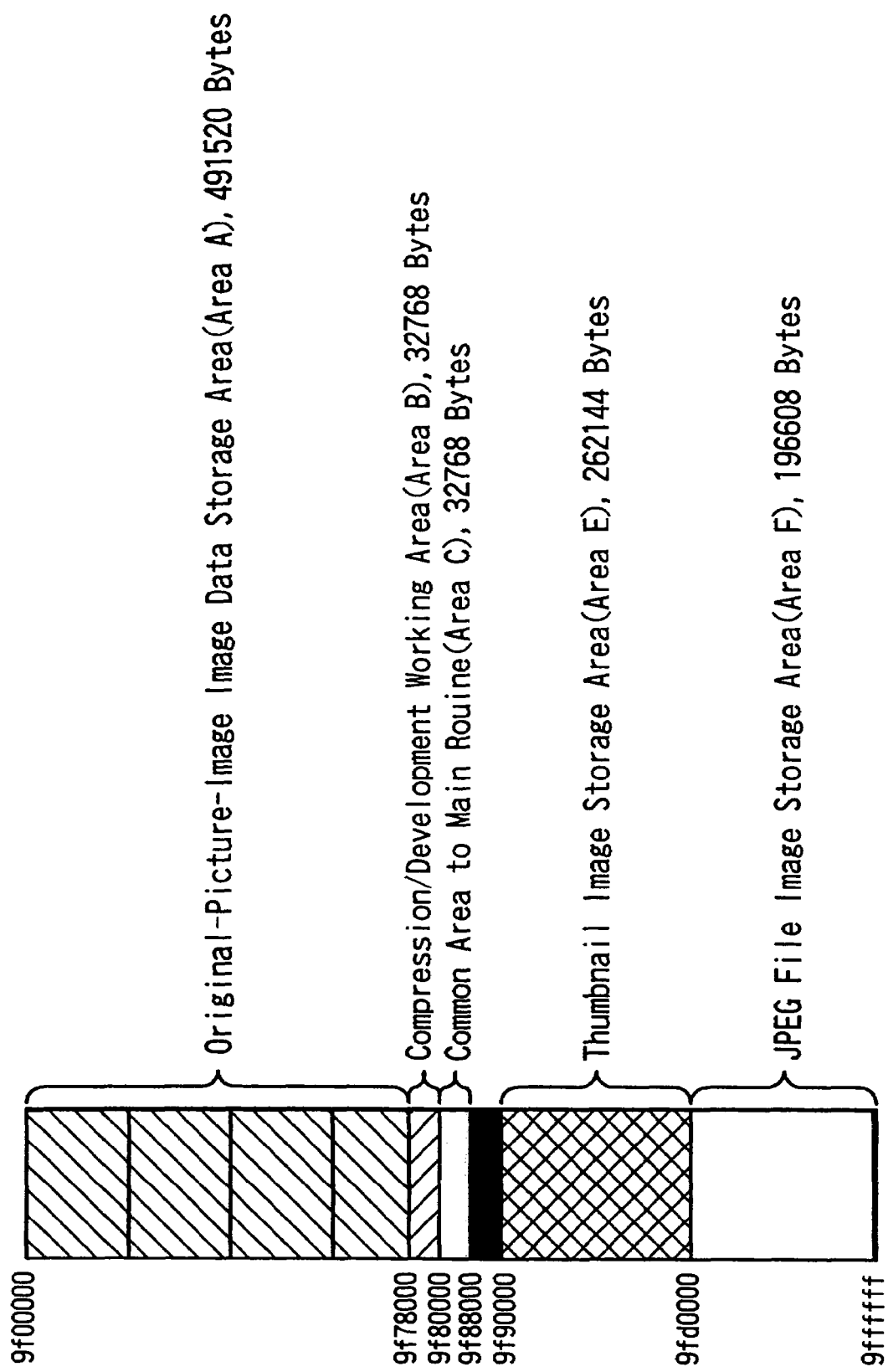
FIG. 7 is a view illustrating an data area of the DRAM.

FIG. 7 is a view illustrating the data areas of the above-described DRAM 24, whose storage capacity is 8 megabytes in total. In the DRAM 24, an area from 9f000000 to 9f77fff of 491025 bytes is allotted as an original picture image data storage area (hereinafter called "an area A") for storing therein image data corresponding to one sheet of main-body image for being displayed on the LCD panel 11. Also, in the DRAM 24, an area from 9f78000 to 9f7ffff of 32768 bytes is allotted as a compression/development working area (hereinafter called "an area B") for performing compression processing, or development processing, with respect to the original picture image data, in accordance with the JPEG method.

It is to be noted that this area B is also used as the area for producing the thumbnail data from the original picture image data.

And, in the DRAM 24, an area from 9f80000 to 9f87fff of 32768 bytes is allotted as a main routine common area (hereinafter called "an area C") as the working area, which permits the microcomputer 28 to execute a main routine at the time of recording and reproduction, whose details will be described later.

Also, in the DRAM 24, an area from 9f90000 to 9fcffff of 262144 bytes is allotted as a thumbnail image storage area (hereinafter called "an area E"), in which are stored a plurality of thumbnail image data files (that correspond to, for example, 50 image sheets). An area from 9fd0000 to 9fffff of 19608 bytes is allotted as a JPEG file image storage area (hereinafter called "an area F"), in which there are stored files of the main-body image data that has been produced by compression thereof performed with the use of the JPEG method.

Figure 8:
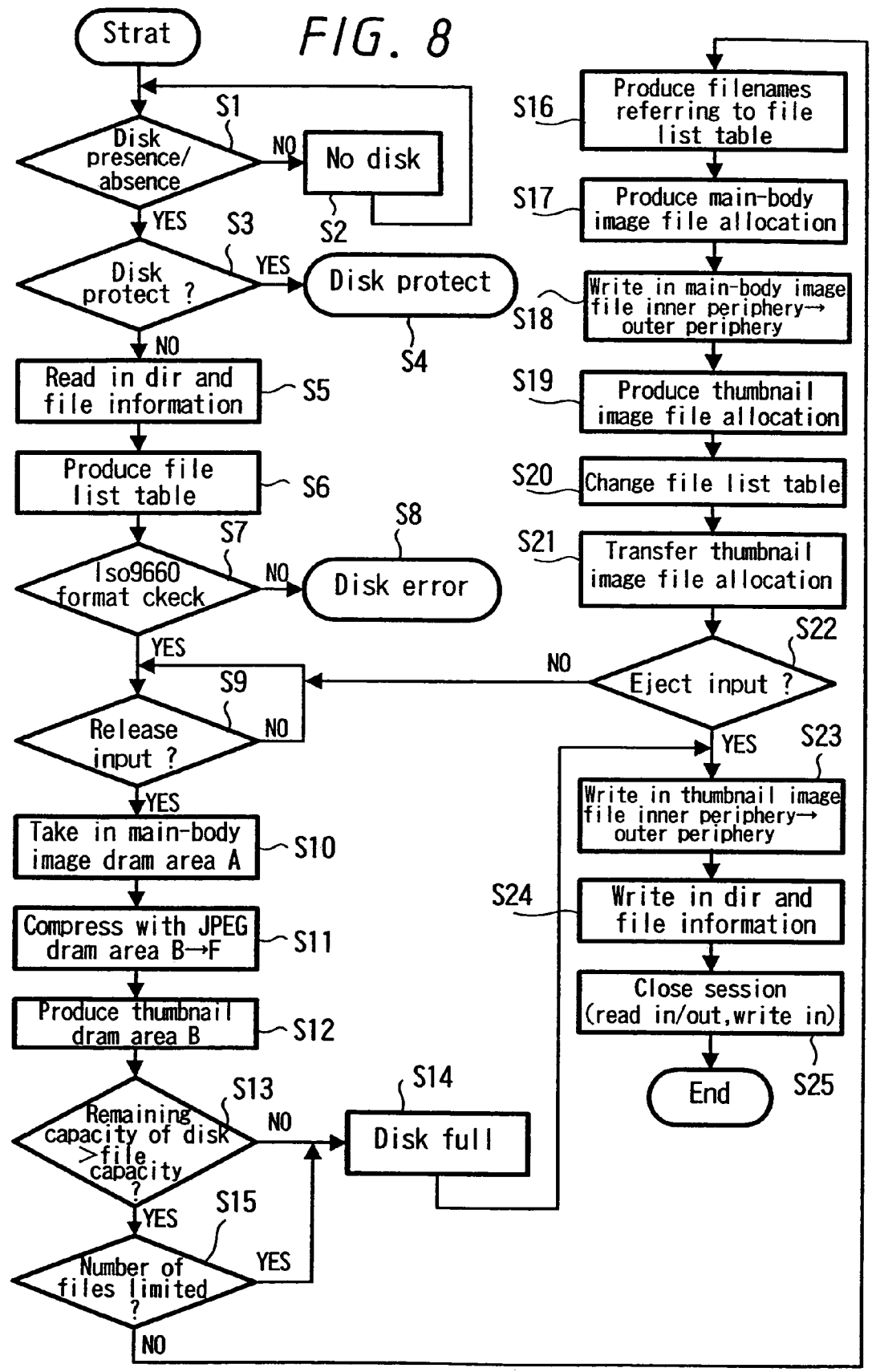
FIG. 8 is a flow chart used to explain the control operation at the time of data recording in the digital camera apparatus.

Next, the control operation when data recording is performed in the digital camera apparatus 1 will be explained with reference to a flow chart of FIG. 8.

In a step S1 after the power source is made on, the microcomputer 28 determines whether or not the optical disk 9 (or the disk cartridge 8) is being loaded. If it has been determined that the optical disk is already loaded, the process proceeds to step S3 while if it has been determined that the optical disk is not loaded, the process proceeds to step S2.

In step S2, the microcomputer 28 causes the characters "NO DISK" to be displayed on the LCD panel 11 to thereby give a warning to a user, and simultaneously waits until the optical disk 9 (or the disk cartridge 8) is loaded.

In step S3, in order to make its determination of whether or not write into the optical disk 9 is possible, the microcomputer detects whether or not write protect is made on the optical disk 9 (or the disk cartridge 8). If write protect is made thereon, the process proceeds to step S4 while if no write protect is made thereon, the process proceeds to step S5.

In step S4, the microcomputer 28 warns the user that write-in is impossible, and terminates the processing. Specifically, the microcomputer causes the characters of, for example, "DISK PROTECT" or the like to be displayed on the LCD panel 11.

In step S5, the microcomputer 28 controls the ODC 31 to thereby reproduce the PVD (information of 16th) of the optical disk 9 through the operation of the optical disk drive 32, and thereby reads in the root directory area and the pass table information in the corresponding track. The microcomputer thereby extracts various items of information such as filenames and their addresses that exist in the data area of the optical disk 9.

The microcomputer 28 in subsequent step S6 produces a file list table (File List Table), and enumerates the various items of information extracted in step S5 in this table. Then, the process proceeds to step S7.

In step S7, the microcomputer 28 checks whether or not the optical disk 9 is a disk with the ISO 9660 method. If the result is YES, the process proceeds to step S9, and if the result is NO, the process proceeds to step S8.

In the step S8 in which the optical disk 9 is not a disk with the ISO 9660 method, the microcomputer 28 causes the characters "DISK ERROR" to be displayed on the LCD panel 11 and terminates the processing.

The microcomputer 28 in step S9 waits until a release is input. Namely, the microcomputer waits until the shutter button 3 illustrated in FIG. 1 is pressed, and, when the shutter button has been pressed, the process proceeds to step S10.

In step S10, the microcomputer 28 stores the image data obtained by photographing an object to be photographed into the area A, illustrated in FIG. 7, of the DRAM 24, and thereby performs take-in processing of the main-body image.

In the next step S11, the microcomputer 28 performs the processing of compressing the image data stored in the area A of the DRAM 24 in the area B with the use of the JPEG method, and thereby produces the main-body image data, and then stores the thus-produced main-body image data into the area F of the DRAM 24 in the form of a file.

In the subsequent step S12, the microcomputer 28 performs thinning of the data of the main-body image previously taken in at the step S10 into a prescribed amount of data at a unit of a pixel, and thereby produces thumbnail image data that is a sub-sample of the main-body image. The microcomputer stores this thumbnail image data into the area B of the DRAM 24 in the form of a file. It is to be noted that, in this digital camera apparatus 1, the thinning of the data is performed so that this thumbnail image file may have a prescribed capacity.

In the next step S13, the microcomputer 28 investigates the remaining recording capacity of the optical disk 9 before recording of the respective items of data therein, for example, by reference to the above-described file list table. And the microcomputer 28 compares this remaining recording capacity and the sum capacity of the main-body image data and the thumbnail image data that are stored respectively in the area F and the area E in the steps S11 and S12. The microcomputer thereby determines whether or not the remaining capacity of the optical disk 9 is large enough to record further. If it has been determined that the remaining capacity is enough, the process proceeds to step S15 while if it has been determined that the remaining capacity is not enough, the process proceeds to step S14.

In the step S14, the microcomputer 28 causes the characters of, for example, "DISK FULL" or the like to be displayed on the LCD panel 11 to thereby give the user a warning of this, the process thereafter proceeding to step S23.

In step S15, the microcomputer 28 investigates the number of the files recorded already in the optical disk 9 by referring to the file list table, and thereby determines whether or not the number of files that are to be further recorded is limited. If the number of further files is limited, namely if filenames can be added any further, the process proceeds to step S14. If this number is not limited, the process proceeds to step S16.

Namely, in the above-mentioned steps S13 and S15, it is determined whether or not the main-body image files and the thumbnail image files can be recorded in the present status of the optical disk 9.

Figure 9:
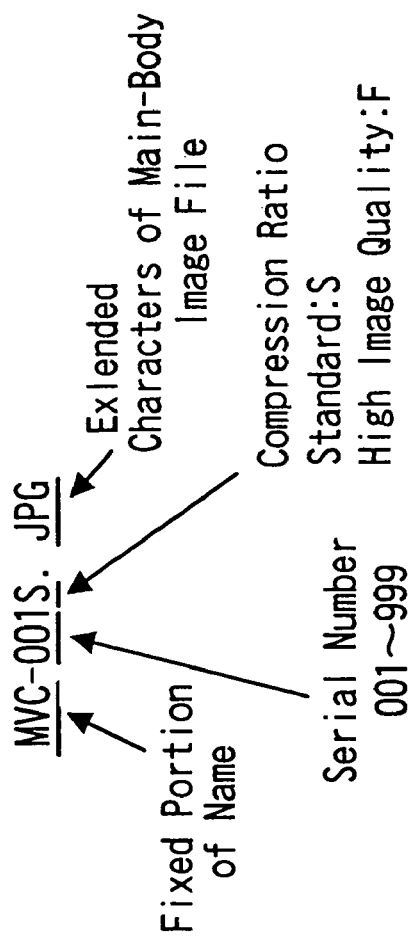
FIG. 9 is a view illustrating the filename of a main-body image file.
Figure 10:
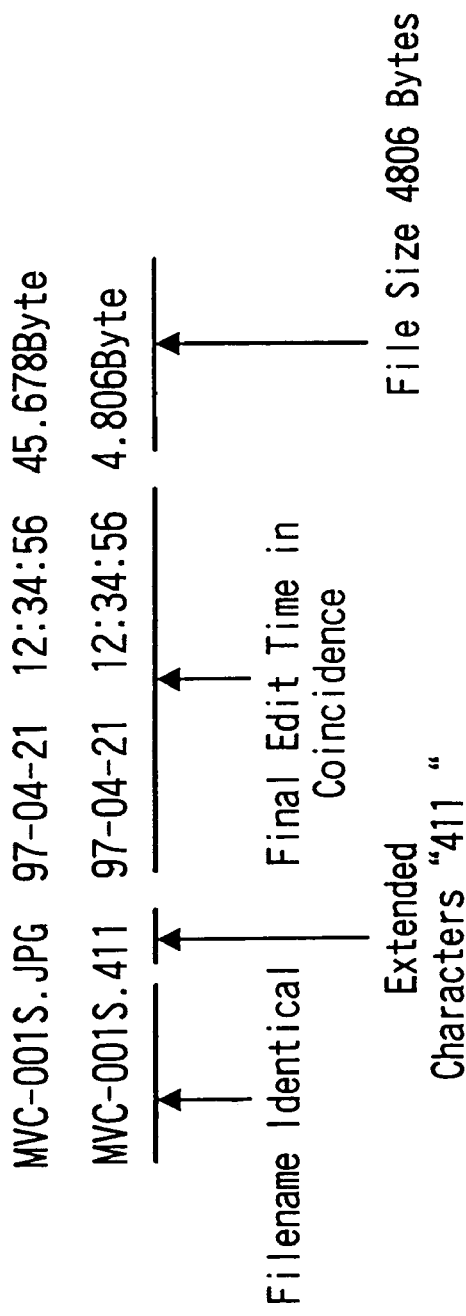
FIG. 10 is a view illustrating information of filenames, recording times, files sizes, etc. of the main-body image file and the thumbnail image file.

In step S16, the microcomputer 28 prepares filenames with regard to the respective ones of the main-body image file and the thumbnail image file. As illustrated in FIG. 9, these filenames become a filename of "MVC-001S. JPG" with regard to the first one of the main-body image files. On the other hand, the first thumbnail image file corresponding to this main-body image file becomes a filename of "MVC-001S. 411" as shown FIG. 10. Namely, the "JPG" and "411" are respectively the extended characters of the main-body image file and the thumbnail image file. The main-body image file and the thumbnail image file differ from each other in respect of only these extended characters alone and become identical in the other portions.

Here, the portion "MVC-" becomes a so-called "name fixed portion" that is used commonly to each of the main-body image file and its corresponding thumbnail image file. Also, the portion "001" is a serial number, for which are used different numerals every main-body image file and its thumbnail image file by referring to the file list table.

This serial number covers from 001 to 999. And a numeric value that is obtained by adding 1 to a maximum number on the disk is made to be a new numeric value. It is to be noted that in a case where by referring to the file list table there has been a main-body image file or a thumbnail image file having a serial number of 999, there is allotted a number that has been chosen from the numeric values, that are among those starting from 001 and that have not been used yet.

Further, the portion "S" is the portion indicating the degree that corresponds to the ratio of compression in which the data of the main-body image file is compressed. In this case, it is shown that the main-body image file is the file that is composed of the data that has been obtained by performing standard compression with respect to this main-body image file. It is to be noted that in a case where the main-body image file is the file that is composed of the data that has been obtained by performing compression for use on high quality of images with respect thereto, this portion becomes "F".

In the next step S17, the microcomputer 28 produces a main-body image file allocation for recording the main-body image file into a prescribed area of the optical disk 9. In the concrete, the microcomputer ensures the area from the inner-peripheral side of the optical disk 9 and thereby determines the area for recording the main-body image file therein and then stores the same.

In the subsequent step S18, the microcomputer 28, by controlling the ODC 31, performs the processing of writing the main-body image file into the area on the optical disk 9 that has been determined in step S17, with the use of the optical disk drive 32.

Further, in step S19, the microcomputer 28 produces a thumbnail image file allocation for recording the thumbnail image file into a prescribed area of the optical disk 9.

Then, in the next step S20, the microcomputer 28 adds the information items regarding those two files to the file list table, and thereby changes this file list table. Then, the process proceeds to step S21.

In step S21, the microcomputer 28 transfers the thumbnail image file from the area B to the area E of the DRAM 24. After finishing the processing in the step S21, the microcomputer 28 confirms the input of the disk EJECT in step S22. If it is input, the microcomputer 28 controls the ODC 31 in step S23 to write the thumbnail image file in an area of the optical disk 9 determined in step S19 by the optical disk drive 32. Then, the microcomputer 28 writes the directory file information updated in step S24 in a predetermined area of optical disk 9 by the optical disk drive 32. Then, the microcomputer 28 writes predetermined information in a read-in read-out area of optical disk 9 in step S25 and performs closure processing of closing the session, and then terminates the process. If the EJECT is not input, the process returns to the state of waiting the input of the release in step S9.

Figure 11:
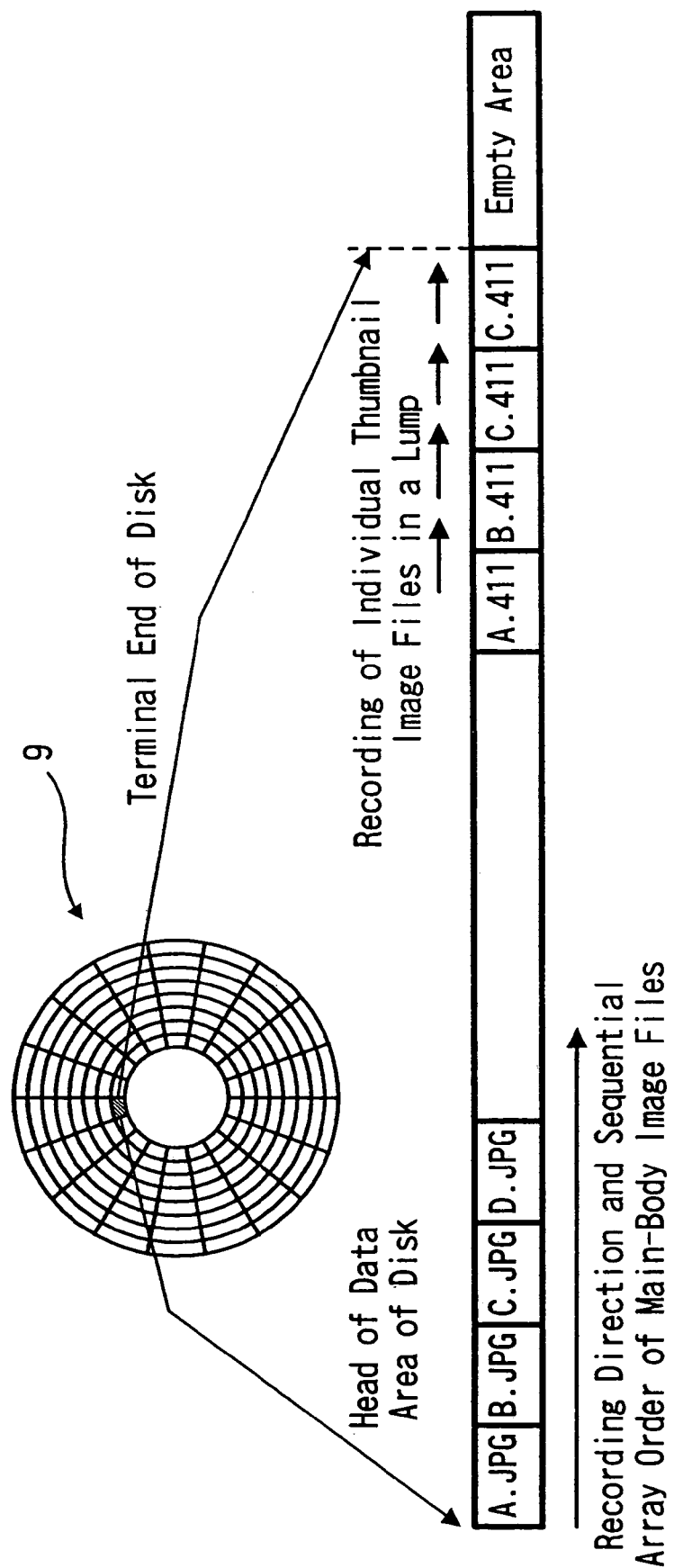
FIG. 11 is a view used to explain the status of the main-body image file and the thumbnail image file that have been recorded on the optical disk.

Through the execution of the above-described steps of processing, in the data area of the optical disk 9 are recorded the main-body image files and the thumbnail image files as illustrated in FIG. 11. It is to be noted that, here, for the sake of explanation, the filenames of the main-body image files and the thumbnail image files are abbreviated as A. JPG, B. JPG, ... and A. 411, B. 411, .... FIG. 11 illustrates a status wherein in a case where having recorded four main-body image files A. JPG, B. JPG, C. JPG, and D. JPG in the order mentioned, the thumbnail image files A. 411, B. 411, C. 411, and D. 411 corresponding thereto are recorded.

Namely, in this digital camera apparatus 1, although the main-body image files are recorded and arrayed sequentially from the head of the data area of the disk, the thumbnail image files are so arranged as to be collectively written in after the disposition of the main-body image files at the time of EJECT of the disk.

In this way, in a case where recording the respective masses of data with respect to the so-called empty optical disk 9, the main-body image files and the thumbnail image files are recorded in the area portions of the optical disk 9 that are physically separated from each other. And, in addition, the thumbnail image data items are recorded successively from one end side of the data area of the optical disk 9. Therefore, reading-out of a plurality of the thumbnail image data items becomes able to be performed quickly as if they were a single file of data items. As a result, the time period required to perform this reading-out thereof is greatly shortened.

Also, since only the thumbnail image data items alone are recorded in a state of one lump, useless data processing becomes unnecessary. Further, since there is no need to cause the main-body image file to hold the thumbnail information therewith, it is not necessary that the thumbnail information depends on the file format of the main-body image file.

Figure 12:
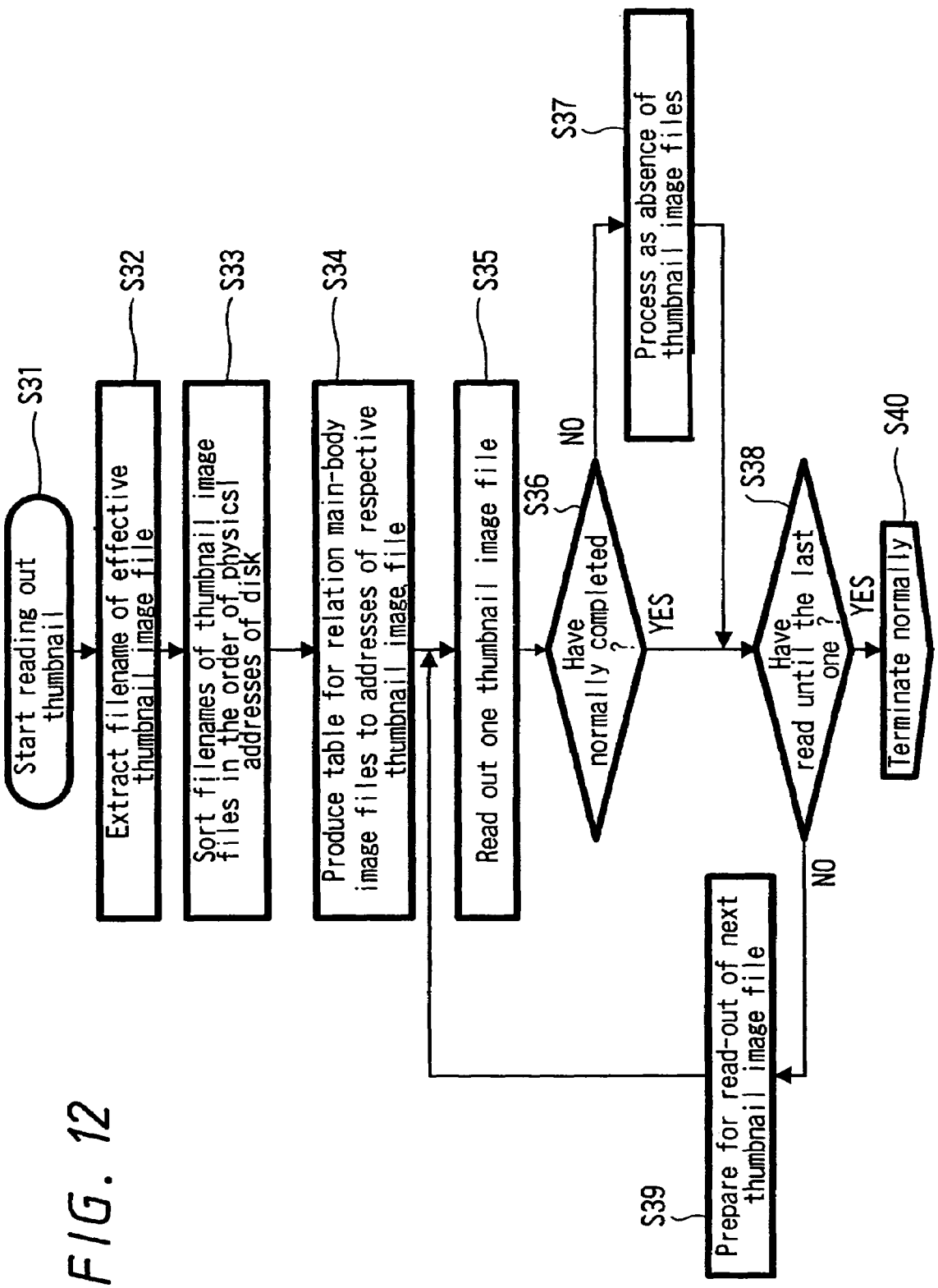
FIG. 12 is a flow chart used to explain the reading-out control of reading out the thumbnail image file when performing reproduction by the digital camera apparatus.

Next, the read-out control for reading out the thumbnail image files when reproduction is made in the digital camera apparatus 1 will be explained with reference to a flow chart of FIG. 12.

After entry into a thumbnail data read-out mode, the digital camera apparatus 1 executes a series of pieces of processing from step S31 to step 40 that are explained below.

In step S31, the microcomputer 28 controls the ODC 31 to thereby reproduce the PVD (16th-sector information) of the optical disk 9 through the operation of the optical disk drive 32, and thereby starts to read out the information on the thumbnail file, then proceeding to step S32.

In step S32, the microcomputer 28 performs processing of extracting the filenames of effective thumbnail image files. Specifically, the microcomputer examines the correspondence relationship of the thumbnail image files to the main-body image files by referring to the root directory information and file management information from the PVD, and thereby discriminates whether or not the thumbnail image files are effective according to whether corresponding main-body image files exist or not. Then, the microcomputer extracts only the filenames of the effective thumbnail image files. Also, when having examined the correspondence relationship between the thumbnail image files and the main-body image files, if the thumbnail image files corresponding to prescribed main-body image files do not exist, the microcomputer has stored therein information such as the filenames of this prescribed main-body image files, etc.

In the next step S33, the microcomputer 28 arranges the thus-extracted filenames of the effective thumbnail image files in the physical address order in the optical disk 9.

In the next step S34, the microcomputer 28 produces a thumbnail management table shown in FIG. 13, that is used for the purpose of relating the main-body image files to the addresses of the respective thumbnail image files. It is to be noted that, in a case where there are no thumbnail image files corresponding to prescribed main-body image files that were stated when reference was made to the step S32, it is arranged that when producing this thumbnail management, table blank image data, whose details will be described later, is allotted to the prescribed main-body image file.

The thumbnail management table includes a column of file numbers, a column of main-body image files and a column of addresses of corresponding thumbnails. In this embodiment, the columns of the file numbers and the main-body image files are arranged in the order of recording of the main-body image files. In the column of addresses of corresponding thumbnails, head addresses in an area upon being stored in the area E of DRAM 24 according to the rearranging order carried out in step S33 are respectively described. As to the main-body image file 005. JPG with no corresponding thumbnail image file, for example, 0 is described as the head address of an area on the DRAM 24 in which a blank image data is stored.

In the subsequent step S35, the microcomputer 28 controls the ODC 31 and thereby reads out one of the thumbnail image files from the optical disk 9 through the operation of the optical disk drive 32. Then, the microcomputer 28 stores this one thumbnail image file into the area E of the DRAM 24 illustrated in FIG. 7, then proceeding to step S36.

In step S35, the thumbnail image file 009. 411 positioned on the outer periphery side of magnetic disk 9a is read out and stored in areas of address numbers of a to b−1 in the area E of DRAM 24, for example, as shown in FIG. 14.

In step S36, the microcomputer 28 determines whether the processing of step S35 has been normally ended, namely whether one thumbnail image file has been normally read out. If it has been determined that this processing has been normally ended, the process proceeds to step S38 while if it has been determined that it has not been normally ended, the process proceeds to step S37.

In step S37 that succeeds when it has been determined in step S36 that the processing has not been normally ended, the microcomputer 28 performs its processing as that no thumbnail image files exist, then proceeding to step S38. Specifically, the microcomputer changes the above-mentioned thumbnail management table and sets a pointer for causing it to correspond to the above-mentioned blank image.

In step S38, the microcomputer 28 determines whether or not having read out the thumbnail image files until the end. If a "YES" determination is made, the process proceeds to step S40 and terminates the processing. If a "NO" determination is made, the process proceeds to step S39.

In step S39, the microcomputer 28 makes a preparation for read-out of the next thumbnail image file and returns to the above-described step S35. As a result of this, the microcomputer 28 repeatedly performs the pieces of processing from step S35 to step S39 until all the effective thumbnail image files are read out.

Then, as shown in FIG. 14, the thumbnail image file is stored in the area E of DRAM 24 in the order of 008.411, 007.411, 006.411, 004.411, 010.411, 002.411 and 001.411.

Incidentally, as described above, because the thumbnail image file 005.411 is not described in the magnetic disk 9a, 006.411 is read in the DRAM 24 after 004.411. Further, the main-body image file with no thumbnail image file exists in the magnetic disk 9a, so that the blank image data for displaying the case instead of the case where no thumbnail file exists is stored in the predetermined area (areas of 0 to a−1 in FIG. 14) of DRAM 24.

After all the thumbnail image files in the magnetic disk 9a are stored in the DRAM 24, the microcomputer 28 controls the DRAM controller 25, the panel signal processing circuits 26 and so on such that 6 pieces of thumbnails are displayed on the LCD 11. At this time, the thumbnails are displayed on the LCD 11 in the order of file number by referring to the thumbnail management table.

Thus, as shown in FIG. 15, 6 pieces of thumbnails are displayed on the LCD 11. By the way, because there is no thumbnail image file corresponding to 005. JPG, the main-body image file name or the like may be displayed within a gray image having a size same as that of, for example, another photographed image as the blank image described above.

In the digital camera apparatus 1, the main-body image file corresponding to one thumbnail among 6 pieces of thumbnails displayed is read out from the magnetic disk 9a based on the operation signal from the operation input unit 27. The main-body image file is stored in the area F of DRAM 24 and displayed on the LCD 11 in an enlarged scale after the development processing is performed by the microcomputer 28 based on the JPEG method.

Next, the mechanical construction in the interior of the digital camera apparatus 1 will be explained. As illustrated in FIG. 16, this digital camera apparatus 1 is so arranged that the housing thereof may be dividable into a front surface side half 2a and a rear surface side half 2b. On the interior side located inward from these halves 2a, 2b are disposed a rotary circuit 41, a chassis 42, and the optical disk drive 32 that was explained in connection with FIG. 3. In practice, the circuit board 41, the chassis 42, and the optical disk drive 32 are each made into a substantially equal and substantially rectangular planar configuration, and these members are disposed within the housing 2 in such a way that these rectangular configurations overlap each other.

Further, concretely, as illustrated in FIG. 16, the circuit board 41 is fixed at its four corner portions to one main surface of the chassis 42 that faces the front surface side half 2a, by a plurality of screws 43. Also, the optical disk drive 32 is attached to, and in opposition to, the other main surface of the chassis 42 facing the rear surface side half 2b via buffer members 45, 46, 47, and 48, whose details will be described later. And it is arranged that the chassis 42 having attached thereto the circuit board 41 and the optical disk drive 32 is fixed to the front surface side half 2a of the housing 2, from the upper side thereof, and is fixed thereto also from the side surface side although illustration thereof is not made, by means of screws 44.

Here, the circuit board 41 is made into a substantially rectangular plate configuration, and, on both main surfaces thereof are mounted various chips such as a LSI, etc. becoming the circuit blocks illustrated in FIG. 3.

The chassis 42 is formed of metal such as stainless steel or the like, and a main surface portion 42a thereof is locally cut out largely. In the chassis 42, from an upper edge side of the main surface portion 42a, a lower edge side thereof, and a right edge side in FIG. 16 are formed, respectively, an upper flange 42b, a lower flange 42c, and a side flange 42d in the direction of these flanges facing the rear surface side half 2b.

The optical disk drive 32 is attached to the chassis 42 by screwing via the four buffer members 45, 46, 47, and 48. Namely, in the upper flange 42b and the lower flange 42c of the chassis 42 and the respective buffer members 45 to 48 are formed hole portions for permitting the passage of screws 49, 50, 51, and 52 therethrough. These screws 49 to 52 are screwed into the threaded holes that have been formed at their corresponding positions of the optical disk drive 32. Then, the optical disk drive 32 is thereby fixed to the chassis 42.

Here, it is arranged that a housing 32b of the optical disk drive 32 and the main surface portion 42a of the chassis 42 are kept out of direct contact with each other, and that the vibrations and impacts that have been applied to the chassis 42 are transmitted to the optical disk drive 32 via each of the buffer members 45 to 48. On the other hand, in the relationship between the chassis 42 and the circuit board 41, as described above, since the four corner portions of the circuit board 41 are fixed to the main surface portion 42a of the chassis 42 by the screws 43, the vibrations and impacts that have been applied to the chassis 42 are transmitted to the circuit board 41 as they are.

The respective buffer members 45 to 48 are the ones which are intended to delay the time period that is taken until the impacts that have been applied from the outside to the housing 2 are transmitted to the optical disk drive 32. Therefore, each of them is formed of an appreciably soft quality of material such as rubber, sponge, silicone, soft plastic and so on. It is to be noted that the respective buffer members 45 to 48 also have the function of transmitting the impacts applied to the housing 2 to the optical disk drive 32 by somewhat weakening the same.

It is to be noted that it is also possible to provide an elastic member such as a spring or the like in place of the buffer members 45 to 48 made of the above-described soft quality of material and thereby cause this elastic member to have the function of absorbing the impacts.

Further, it is also possible to provide a damper or the like and thereby, as in the case of the above-described buffer members 45 to 48, make this damper have the vibration-absorbing function of absorbing the vibrations that have occurred in the elastic member due to the impacts.

Further, it is also possible to make a concurrent use of the impact absorbing function and the vibration absorbing function. Furthermore, by using semi-fluidizable material such as a gel or the like, it is also possible to make the same material exhibit the two functions.

Additionally, although, in the above-described embodiment, it is arranged that the optical disk drive 32 and the housing 2 are connected to each other via the chassis 42, it may be arranged that the optical disk drive 32 and the housing 2 are connected to each other without the intervention of the chassis 42 between these two members. In this case, it is sufficient that the hole portions for the passage of the screws 49 to 52 therethrough be formed on the housing 2 side; and the screws 49 to 52 be inserted into these hole portions, thereby mounting the optical disk drive 32 to the housing 2 via each of the buffer members 45 to 48.

Figure 17A:
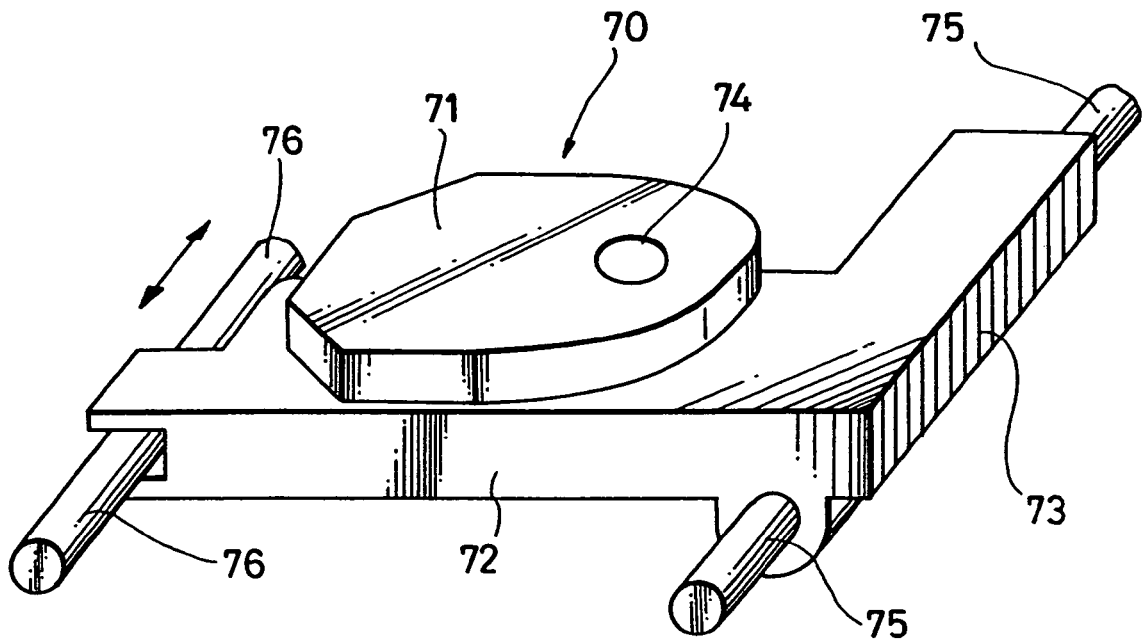
FIG. 17 are views illustrating the mechanisms regarding the optical head that is disposed within the housing of the optical disk drive.

FIG. 17 is a view illustrating the optical head disposed within the housing 32b of the optical disk drive 32 and its neighboring mechanisms. As illustrated in FIG. 17A, the optical pick-up 70 is disposed within the housing 32b of the optical disk drive 32.

This optical pick-up 70 is constructed of two members 71 and 72. And a lens 74 is seen in the upper surface of the upper member 71.

This lens 74 is located in such a way as to oppose the main surface of the optical disk 9.

Within the interiors of the upper and lower members 71 and 72 of the optical pick-up 70 there exist, although not illustrated, a semiconductor laser for emitting laser light that is to be radiated onto the optical disk, an optical path of laser light and various optical parts, a biaxial actuator for controlling the movement for causing focusing and tracking of the lens 74 for converging and radiating the laser light onto the optical disk, a light receiving element for receiving and detecting a laser light reflected from the optical disk 9, etc.

Figure 17B:
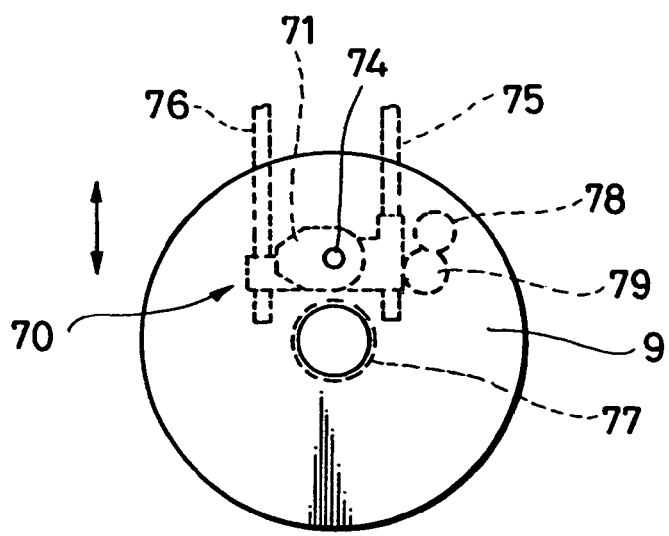

Also, as illustrated in FIG. 17B, there exist also a feed motor (sled motor) 78 for making a drive for moving the optical pick-up 70 in the radial direction of the optical disk 9, and rails 75 and 76 that serve as guides for this movement.

Specifically, the lower member 72 of the optical pick-up 70 slides along the rails 75 and 76 and thereby the optical pick-up is moved in the radial direction of the disk. On the feed motor 78 side of the member 72 are formed teeth 73. To the teeth is transmitted the drive of the feed motor 78 via a gear 79.

Also, on the central lower side of the main surface of the optical disk 9 is disposed a spindle motor 77 for making rotation drive of the optical disk 9.

The optical pick-up that serves as the optical head operates with respect to the optical disk 9 rotated by the spindle motor in a direction parallel with the main surface thereof. This operation is made at a distance interval that enables the laser light to be radiated onto a prescribed area of the recording surface of the optical disk 9 by convergence of laser light by the objective lens.

And it is arranged that the main-body image data or the thumbnail image data is recorded or reproduced by heating due to the radiation of laser light onto the recording track of the optical disk 9, or by detecting the signal of the laser light reflected by the recording track of the optical disk 9.

And the optical pick-up moves along the rails (the guide shafts) 79 in the radial direction of the optical disk 9 (the arrow-indicated direction in FIGS. 17A and 17B). To be concrete, when the sled motor rotates through a prescribed angle of rotation, the optical pick-up moves over each of the recording tracks formed on the optical disk 9 in the radial direction of the optical disk 9.

Here, when a high strength of impact is applied to the optical disk drive 32 as a whole, the housing 32b thereof and the head arm 73 are flexed, with the result that the positional displacement of the optical head with respect to the recording track of the optical disk 9 is caused, which becomes a cause of defective write-in when recording of data is performed.

Figure 18:
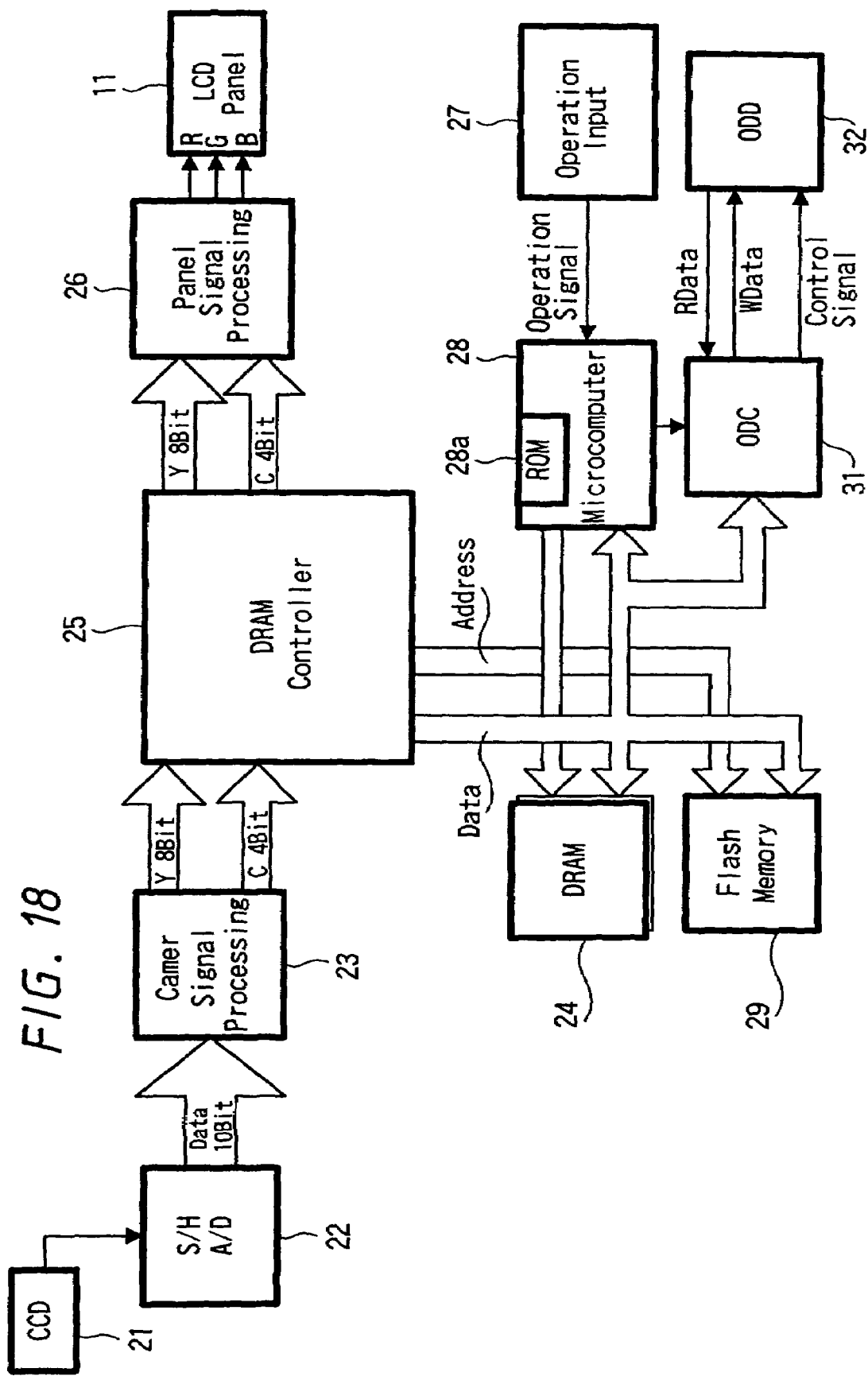
FIG. 18 is a block circuit diagram illustrating another embodiment of the digital camera apparatus.

As illustrated in FIG. 18, this digital camera apparatus 1 may be made to have a construction having a flash memory 29. In the embodiment of FIG. 18, the DRAM 24, the DRAM controller 25, the microcomputer 28, the flash memory 29, and the ODC 31 are connected to one another by common buses. By making this construction, in the digital camera apparatus 1, for example, in order to cause version-up of the function of the digital camera apparatus 1, it becomes possible to store the programs for use on the version-up into this flash memory 29. In practice, the optical disk 9 having recorded therein a program for compressing the image data with the use of a method other than the above-described JPEG method is loaded onto the optical disk drive 32, and, from the optical disk, this program is read into the flash memory 29, thereby enabling the extension of the function.

Namely, in the digital camera apparatus 1, the controls of the respective blocks are performed by using the software programs stored within the ROM 28a of the microcomputer 28. Therefore, the software programs for use on various pieces of version-up are stored in the flash memory 29, and it may be arranged to make these software programs work instead of the microcomputer 28 or assist the microcomputer 28.

According to the digital camera apparatus 1 of the above-described embodiment, the light signal of an object to be photographed from the optical system is recorded into the optical disk 9 after having been converted to a prescribed format of data by the CCD photographing element 21, the A/D conversion unit, the data compression means, and the data conversion. Therefore, by loading this optical disk 9 having had the static images of the photographed object recorded therein onto the optical disk drive of a personal computer, it is possible to easily watch the photographed static image on the personal computer. Accordingly, it becomes unnecessary to transfer the photographed-static-image data to the hard disk or floppy disk in the personal computer and copy the same after photographing. As a result of this, the user is released from a large amount of time and the labor that are otherwise needed for transfer of the data.

And, especially, by using the direct read after write type optical disk or the rewritable optical disk 9 as the recording medium as described above, a large number of images can be recorded on one sheet of optical disk 9.

Further, in a case where having used the optical disk 9 whose diameter is 80 mm, there is the merit of enabling miniaturization of the digital camera apparatus 1 and, in addition, there is also the merit that the user can easily watch the images as described above. This is because in the optical disk drive loaded in a personal computer, ordinarily, not only the optical disk having a diameter of 120 mm but also the optical disk having a diameter of 80 mm can be reproduced.

The camera apparatus of the present invention is not limited to the above-described embodiment and permits various other constructions to be made without departing from the subject matter of the present invention.

According to the above-described digital camera apparatus 1 of the present invention, the light signal of an object to be photographed from the optical system is recorded onto the optical disk 9 after having been converted to a prescribed format of data by the photographing element, the A/D conversion unit, the data compression means, and the data conversion. Therefore, by loading this optical disk having had the static images of the photographed object recorded thereon onto the optical disk drive of a personal computer, it is possible to easily watch the photographed static images on the personal computer. Accordingly, it becomes unnecessary to transfer the photographed-static-image data to the hard disk, the floppy disk or the like in the personal computer and copy the same after photographing. As a result of this, the user is released from the large amount of time and the labor that are otherwise needed for transfer of the data.

Also, since the price of the medium is relatively inexpensive and the user can therefore possess many sheets of medium, the user is released from the limitation that is imposed on the number of photograph sheets.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A camera apparatus, comprising:
    an optical system;
    a photographing element for converting a light signal of an object to be photographed from the optical system to an electric signal;
    an A/D conversion unit for converting the electric signal from the photographing element to image data;
    a control means for compressing the image data from the A/D conversion unit, converting the compressed image data to a prescribed format, and producing thumbnail image data corresponding to the compressed and converted image data; and
    means for recording the image data of the prescribed format corresponding to each photographed object starting at a head end of a data area on an optical disc and recording the thumbnail image data sequentially backwards from a terminal end of the data area on said optical disk; whereby the image data is physically separated from the corresponding thumbnail image data,
    wherein the image data of the prescribed format is read by a personal computer from the optical disc without being transferred to the personal computer.

2. The camera apparatus according to claim 1, wherein a common file name is given to the thumbnail image data corresponding to the compressed and converted image data.

3. The camera apparatus according to claim 1, wherein serial numbers with a time are given to the compressed and converted image data and the thumbnail image data.

4. The camera apparatus according to claim 1, wherein said optical disk has a diameter of 80 mm.

5. A method of image processing for a camera apparatus, comprising the steps of:
    converting a light signal of an object to be photographed from an optical system to an electrical signal;
    A/D converting the electric signal to image data;
    compressing the image data;
    converting the compressed image data to a prescribed format;
    producing thumbnail image data corresponding to the compressed and converted image data; and
    recording the image data of the prescribed format corresponding to each photographed object starting at a head end of a data area on an optical disc and recording the thumbnail image data sequentially backwards from a terminal end of the data area on said optical disk; whereby the image data is physically separated from the corresponding thumbnail image data,
    wherein the image data of the prescribed format is read by a personal computer from the optical disc without being transferred to the personal computer.

6. The method according to claim 5, wherein a common file name is given to the thumbnail image data corresponding to the compressed and converted image data.

7. The method according to claim 5, wherein serial numbers with a time are given to the compressed and converted image data and the thumbnail image data.

8. The method according to claim 5, wherein said optical disk has a diameter of 80 mm.

* * * * *

UNITED STATES PATENT AND TRADEMARK OFFICE
CERTIFICATE OF CORRECTION

| | | |
|---|---|---|
| PATENT NO. | : 7,612,809 B2 | Page 1 of 1 |
| APPLICATION NO. | : 11/110573 | |
| DATED | : November 3, 2009 | |
| INVENTOR(S) | : Kumagai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this

Nineteenth Day of October, 2010

David J. Kappos
*Director of the United States Patent and Trademark Office*